Figure 1:
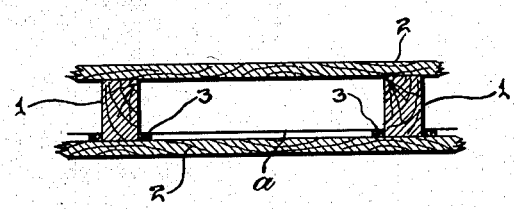

Oct. 1, 1935.  E. SCHMIDT  2,015,817

HEAT INSULATION FOR WALL STRUCTURES

Original Filed April 30, 1926

INVENTOR
*Ernst Schmidt*
BY
ATTORNEYS

Patented Oct. 1, 1935

2,015,817

UNITED STATES PATENT OFFICE 2,015,817

HEAT INSULATION FOR WALL STRUCTURES

Ernst Schmidt, Danzig, Free City of Danzig, assignor to N. V. Internationale Alfol Maatschappij, Amsterdam, Netherlands, a corporation of the Netherlands Continuation of application Serial No. 105,753, April 30, 1926. This application March 30, 1933, Serial No. 663,572. In Germany July 4, 1925.

9 Claims. (Cl. 72—16)

This application is a continuation of application Ser. No. 105,753, filed on April 30, 1926, by me together with Edward Dyckerhoff, and is specific to wall structures and wall structural units, whereas application, Ser. No. 635,263, filed September 28, 1932, which is likewise a continuation of said joint application, covers my invention as applied to structures of all sorts.

The essential feature of my invention is the use of very thin sheets having heat reflective metal surfaces in conjunction with air spaces adjacent the same, to provide heat insulation. I have discovered that where such sheets, preferably in the form of metal foil, are employed, the exchange of heat by radiation is decreased to such an extent that it is possible to use much thicker layers of air than had heretofore been thought efficient by limiting the air layers with bright foil and that where the layers of air are subdivided they need be subdivided only to a small extent and still obtain great efficiency. Transference of heat by convection currents in such layers of air, contrary to general opinion, only increases slightly with the thickness of the layers. In order to obtain greater insulating properties several layers of air limited by metal foil may be arranged, one alongside of the other.

Thin aluminum foil is especially suitable for the purpose of the invention, although any suitable metal may be employed provided it remains bright and possesses a low radiation factor. In other words, the metal selected should be one but little affected by oxidation or other form of surface change. A particular advantage attached to the employment of thin foil for the purpose of the invention is that in spite of the high heat conductivity of the metal from which the foil is made, little heat flows lengthwise along the foil. A sheet of metal foil therefore only conducts away a small amount of heat even from its point of contact with parts at high temperature; and a further advantage of using thin sheets of foil is that upon expansion such sheets bend readily and consequently exert no appreciable force at their points of contact with the body to be insulated, whereas thick metal sheets and other insulating devices constituted by rigid bodies would move with respect to the body which they are insulating and thus gradually become loosened from the body.

In applying my invention to building structures, the foil ordinarily will be positioned in the air spaces normally formed in the walls, and for this purpose, ceilings and the like may be considered as walls.

The foil may be used in various ways; thus the member to be insulated may be covered with one or more thin sheets of metal foil, which preferably will only come into contact with the body to be insulated at a few points with air spaces formed between it and the surface of the body to be insulated. For example, when particularly high insulating properties are not required good results may be obtained by employing only one or two sheets in which case the metal sheets are used for defining or limiting the air space; or one or more sheets may be mounted in a layer of air in such manner as to divide the layer of air into a number of layers. Also it may be advantageous to fill the air spaces with sheets having heat reflective metal faces and provided with means formed from the sheets themselves for keeping the sheets spaced apart. While this is a form in which my invention may be employed, I do not claim this embodiment specifically, as it likewise embraces an invention which I believe was made by Eduard Dyckerhoff.

In this form of the invention the sheets may be crimped to form projections which will serve to keep adjacent sheets spaced apart, or sheets of foil may be crumpled so that the irregularities of the sheet will form such spacing means and serve to keep the sheets at a relatively wide average spacing.

Ordinarily the insulation should be provided with some protective covering, which may itself be lined with the foil. In the case of building structures where the foil is used in the walls, such protective covering will ordinarily be found in the structural units of the walls themselves, but it is obvious that where the foil is used between structural members which normally are left open (as for example in the case where the foil is used between the rough beams of an unfinished attic) an additional protection may be supplied in the form of a covering or cap for the beams, which as stated, may itself be lined with the foil.

Figure 2:
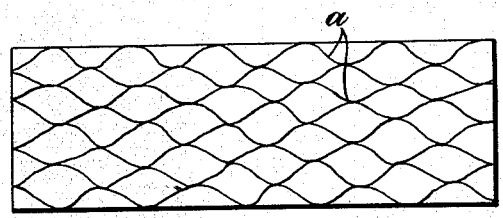

My invention can readily be understood from the foregoing description taken together with the accompanying drawing which illustrates my invention:

In the drawing, Fig. 1 is a sectional view illustrating a portion of a ceiling or wall structure using a single layer of foil arranged adjacent one of the sides thereof, and Fig. 2 is a diagrammatic arrangement illustrating the use of crumpled foil to maintain an air space between the foil and the member which supports or carries it.

In Fig. 1, the structure is provided with an air space, here shown as formed by the studding members 1, on each side of which are attached the built-up sheathing elements 2, which are here illustrated for the purpose of example as made of wood. The side of this air space shown at the bottom, is bounded by a foil sheet $a$ which is shown as spaced from the sheathing element 2 which it covers, and on which it is carried, by the wooden strips or spacing members 3 which are positioned intermediate the studding members 1. By using an intervening means to keep the foil out of direct contact with the main body of the sheathing element which carries it, the direct transmission of heat by conduction to the foil necessarily will be largely reduced even if the space between the foil and the sheathing element 2 is very slight.

In Fig. 2 the foil is crumpled in such a way that the irregularities form means for keeping the foil layers separated so that the very thin foil forms a loose, foamy filling which may be used for air spaces of various kinds. Where a single sheet is used this principle obviously may be employed to keep such sheet spaced partly away from the element which it covers, in which case the distortion of the sheet may do away with the necessity of intervening spacing means such as shown in Fig. 1. In this connection there is very little transfer of heat to the metallic surface by conduction (since the metal used will be so thin as to have but little effect as a conductor), whereas, if the metal is applied directly to the surfaces which form the air space, only one face of the sheet will function to reflect heat and the heat will be transmitted to and from the other face by conduction.

Where foil is employed it may be of varying thicknesses. Thus, the foil used in the manner of Fig. 1 may be as thick as .05 millimeter, though this thickness is not essential. For the crumped form of Fig. 2 it is preferable to use very thin foil; thus, the foil may be used as thin as .005 millimeter or thinner if obtainable. It is understood that these figures indicate the range of thickness of foil employed but are not intended to be restrictive as to the dimensions used in the particular embodiments of the invention as that will vary with many different factors.

While in the foregoing specification I have principally referred to metal foil, it is to be understood that although metal sheets are preferably employed for the purposes of the invention, and particularly aluminum sheets on account of the constantly bright surface of the latter, other suitable or similar materials may also be employed, which on account of their bright surface have the property of decreasing loss of heat by radiation.

My insulation may be employed in constructural work for walls and roofings, and may be employed as stated for filling hollow spaces or for an insulating surface, an outer casing or wall being provided for the purpose of protecting the insulating material. For example, plates, casings or mattresses comprising specially formed hollow spaces may be manufactured filled with the new insulating material and employed for covering surfaces requiring insulation. Further, in addition to its use in rigid wall structures such as have been described, my invention may be used in flexible wall structures such as tents. In such case where the thin layers limiting the air space are liable to be deformed by means of pressure or the like, resilient intermediate layers by which the separate layers are maintained at a distance from one another are employed.

This invention has been illustrated by a construction formed of actual studs and sheathing elements and therefore these terms are used in the appended claims, but it is understood that the invention can apply to any conventional wall construction in which the approximately flat wall elements built up of any desired material are held in spaced relation to form enclosed air spaces.

What I claim is:

1. In a building wall comprising studding members and approximately flat, substantially non-metallic sheathing elements on both sides of such studding members to form a wall with substantially enclosed air spaces, flexible metal foil in such a space, mounted to permit such foil to flex if expanded by heat, carried by an element connecting adjacent studding members and substantially covering a face of such element so that such element serves to define such a space and limit the movement of air therein, and said foil serves to limit the transmission of radiant heat across said air space from or to the covered face of such element.

2. A building wall comprising studding members and substantially rigid built-up sheathing elements on both sides of the studding members to form a usual type of substantially enclosed air space in the wall, one of said sheathing elements carrying a lining of thin metallic foil covering its inner face and having non-metallic supporting means for the foil carried on its inner face holding the foil lining substantially out of contact with the main body of such sheathing element.

3. A non-metallic substantially rigid sheathing element for building walls to be carried by studding or the like to substantially cover a face of usual type of enclosed air space within the wall, having a lining of thin metallic foil covering the inner face of such element and non-metallic carrying means for the foil attached to the inner face of such element and holding the foil lining substantially out of contact with the main body of such element.

4. In a usual wall structure comprising studding members and rigid sheathing elements on both sides thereof to form air spaces, a lining of flexible foil carried by the sheathing elements on one side, and non-metallic means positioned intermediate the studs for holding such lining spaced away from the sheathing element on which it is carried whereby the transmission of heat by conduction from the usual wall structure to such foil is substantially reduced.

5. In a building wall comprising studding members and built up substantially rigid sheathing elements on both sides thereof to form a wall with substantially enclosed air spaces, thin metal foil disposed within such a space and adjacent a side thereof presenting a metallic surface exposed to said air space to reflect heat radiations and arranged so as to substantially cover the inner face of one of said rigid elements on one side of such an air space and connected with such rigid element at such side at spaced intervals but so arranged as to be held sufficiently free from said rigid sheathing element for the greater part of its area to largely prevent the transmission of heat to it by conduction.

6. A building wall having a usual type of enclosed air space within the same and comprising a substantially rigid built-up sheathing element covering one face of said air space, said element carrying a lining of thin metallic foil which is substantially co-extensive with and substantially parallel to the surface of such element which faces said space.

7. A non-metallic substantially rigid sheathing element for building walls to be carried by studding or the like to substantially cover a face of usual type of enclosed air space within the wall, said element having a lining of thin metallic foil which is substantially co-extensive with and substantially parallel to the surface of such element which faces said space.

8. A building wall having a usual type of enclosed air space within the same and comprising a substantially rigid built-up sheathing element covering one face of said air space, said element carrying a lining of a thin heat-reflective material incapable, before application, of self-support, said lining being substantially co-extensive with and substantially parallel to the surface of such element which faces said space.

9. A non-metallic substantially rigid sheathing element for building walls to be carried by studding or the like to substantially cover a face of usual type of enclosed air space within the wall, said element having a lining of a thin heat-reflective material incapable, before application, of self-support, said lining being substantially co-extensive with and substantially parallel to the surface of such element which faces said space.

ERNST SCHMIDT.